(12) United States Patent
Beall et al.

(10) Patent No.: US 6,207,101 B1
(45) Date of Patent: *Mar. 27, 2001

(54) METHOD OF MAKING FIRED BODIES

(75) Inventors: Douglas M. Beall, Painted Post, NY (US); Devi Chalasani, San Jose, CA (US); Gregory Albert Merkel; Y. Lisa Peng, both of Big Flats, NY (US)

(73) Assignee: Corning Incorporated, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/408,671

(22) Filed: Sep. 30, 1999

(51) Int. Cl.$^7$ .................. C04B 35/632; C04B 35/634
(52) U.S. Cl. .................. 264/630; 631/638; 631/639; 631/669; 631/670; 419/36; 419/37; 419/41
(58) Field of Search .................. 264/109, 177.11, 264/177.12, 630, 631, 669, 670, 638, 639; 419/65, 67, 36, 37, 41

(56) References Cited

U.S. PATENT DOCUMENTS

| | | |
|---|---|---|
| 3,885,944 | 5/1975 | Lachman et al. . |
| 4,758,272 | 7/1988 | Pierotti et al. . |
| 4,992,233 | 2/1991 | Swaroop et al. . |
| 5,427,601 | 6/1995 | Harada et al. . |
| 5,568,652 | 10/1996 | Wu . |
| 6,080,345 * | 6/2000 | Chalasani et al. .................. 264/109 |
| 6,113,829 * | 9/2000 | Bookbinder et al. .................. 264/630 |
| 6,132,671 * | 10/2000 | Beall et al. .................. 264/638 |

OTHER PUBLICATIONS

U.S. application No. 09/115,929, Bookbinder et al., filed Jul. 15, 1998.
U.S. application No. 09/116,144, Chalasani et al., filed Jul. 15, 1998.
U.S. application No. 09/320,938, Beall et al., filed May 27, 1999.
U.S. application No. 09/321,013, Beall et al., filed May 27, 1999.
U.S. application No. 60/109,408, Beall et al., filed Nov. 20, 1998.

* cited by examiner

*Primary Examiner*—James Derrington
(74) *Attorney, Agent, or Firm*—L. Rita Herzfeld; Anca C. Gheorghiu

(57) ABSTRACT

A fired body and method of making involves compounding powder, binder, aqueous solvent for the binder, surfactant, and non-solvent with respect to at least the binder, the solvent, and the powder, with the addition of an organosilicon compound. The non-solvent is lower in viscosity than the binder combined with the solvent, and the amount of solvent is less than the amount that would be used absent the non-solvent. The components are mixed and plasticized and then shaped into a green body, which is then fired to produce the product body. The organosilicon compound enhances the stiffness in the green body afforded by other non-solvents, and results in increased strength and reduced cracking in the fired body, among other advantages.

17 Claims, No Drawings

METHOD OF MAKING FIRED BODIES

FIELD OF THE INVENTION

An organosilicon compound is included in formable plasticized powder mixtures that contain binder, solvent for binder, and a component in which at least the binder, its solvent, and the powder materials are insoluble, referred to as the non-solvent. The mixtures are shaped into green bodies and then fired. The organosilicon compound, which can be part of the non-solvent, or separate from the non-solvent, results in a number of advantages depending on how it is used. Among the advantages are increased stiffness and wet strength in the mixture and the green body, shape retention, less heat generation especially at the critical low temperature end of the firing cycle, less heat differential from outside to inside of the body, and significantly increased strength of the body through the low temperature profile of the firing schedule where binder burn-off occurs. On firing, the organosilicon compound converts to an inorganic binder that contributes to the strength and durability of the fired product. The fired bodies of this invention exhibit significantly reduced cracking.

BACKGROUND OF THE INVENTION

Powder mixtures having a cellulose ether binder are used in forming articles of various shapes. For example ceramic powder mixtures are formed into honeycombs which are used as substrates in catalytic and adsorption applications. The mixtures must be well blended and homogeneous in order for the resulting body to have good integrity in size and shape and uniform physical properties. The mixtures have organic additives in addition to the binders. These additives can be surfactants, lubricants, and dispersants and function as processing aids to enhance wetting thereby producing a uniform batch.

A major and ongoing need in extrusion of bodies from highly filled powder mixtures, especially multicellular bodies such as honeycombs is to extrude a stiffer body without causing proportional increase in pressures. The need is becoming increasingly critical as thinner walled higher cell density cellular structures are becoming more in demand for various applications. Thin walled products with current technology are extremely difficult to handle without causing shape distortion.

Rapid-setting characteristics are important for honeycomb substrates. If the cell walls of the honeycomb can be solidified quickly after forming, the dimension of the greenware will not be altered in subsequent cutting and handling steps. This is especially true for a fragile thin-walled or complex shaped product, or a product having a large frontal area.

Prior rapid stiffening methods involve time-delayed stiffening using rapid set waxes as disclosed, for example in U.S. Pat. No. 5,568,652. These methods involve extrusion of soft batches. Historically, for highly filled ceramic mixtures, soft batches have lead to better extrusion quality. Attempts to extrude stiffer ceramic batches with the current batch components, i.e. cellulose ether binder, lowering the amount of water and/or additives such as sodium tallowate or sodium stearate have not been very successful because of the higher extrusion pressures resulting from collision of finer particles, and the abrasiveness of the materials involved.

The growing need for thinner webs (1–2 mil)/high density cellular products to be extruded to shape necessitates stiffening at the very instant the batch exits the die.

More recently, the above problems have been solved by forming stiff batches during plasticization increasing the binder to solvent ratio in the batch. This is done by partial removal of the solvent and supplementing the batch with a non-solvent, which is generally organic, to provide fluidity. However, the organics can pose problems during the firing of the green bodies, due to exothermic reactions that can cause cracking in the bodies, resulting in a weakened structure. This is especially true with multicellular structures such as honeycombs. In particular, very thin-walled structures are especially susceptible to cracking during firing.

The present invention fills the need for instantaneous stiffening of batches, which is especially beneficial for extrusion of thin walled honeycombs, and shape retention of extruded bodies at the very instant the batch exits the die, while at the same time providing for minimized exothermic reactions during the firing cycle, increasing the strength of the body during firing, and reducing cracking.

SUMMARY OF THE INVENTION

In accordance with one aspect of the invention, there is provided a method of making a fired body that involves compounding powder, binder, aqueous solvent for the binder, surfactant, and non-solvent with respect to at least the binder, the solvent, and the powder, with the addition of an organosilicon compound. The non-solvent is lower in viscosity than the binder combined with the solvent, and the amount of solvent is less than the amount that would be used absent the non-solvent. The components are mixed and plasticized and then shaped into a green body, which is then fired to produce the product body. The organosilicon compound enhances the stiffness in the green body afforded by other non-solvents, and results in increased strength and reduced cracking in the fired body, among other advantages.

In accordance with another aspect of the invention, there is provided a body made by the above-described method.

DETAOLEd DESCRIPTION OF THE INVENTION

This invention relates to a method for forming and shaping stiff plasticized powder mixtures into green bodies that are subsequently fired. The mixtures contain a binder, solvent for the binder, surfactant, and a component in which at least the binder, its solvent, and the powder materials are essentially insoluble. This latter component is referred to as the non-solvent, although in actuality, there can be some solubility of the binder and the solvent in the non-solvent. The non-solvent is chosen to result in an increase in stiffness or wet green strength in both the mixture and in the green body that is eventually shaped. Furthermore, this increase in wet green strength occurs without proportional increases in forming pressure or mixing torque. Also, in extrusion of the above mixtures, the shape of the extrudate or green body is retained at the very instant it exits the die, with no time delay.

This invention relates to an approach using an organosilicon compound in the forming mixture. When used either as at least part of the non-solvent or separate from the non-solvent, the organosilicon compound enhances the stiffness and feedrate capability that are achieved as a result of having a non-solvent in the mixture. This material generates less heat during the firing cycle, so that cracking that would ordinarily occur due to rapid loss of the organics, is significantly reduced, and results possibly in reduced total volume of volatile species present. Furthermore, the fired product has greater strength due to conversion of the silicon species to silica which serves as an inorganic binder for the particles.

In historic batches, that is, batches of like composition but without the non-solvent, where there would be more solvent, a mixture or batch of a given composition can be made stiff by removing liquids. But extrusion of such stiff batches results in proportional increase in extrusion pressures and torque with enhanced flow defects such as e.g. swollen or deformed webs (in honeycombs). The method of the present invention enables forming e.g. extrusion of a stiff batch without adversely affecting performance such as pressures, torque, and the flow characteristics. Also, upon firing, crack-free bodies are produced.

The method involves forming a stiff batch instantaneously during the plasticization stage of mixing the batch. Stiff batches are formed during plasticization by increasing the binder to solvent ratio in the batch. This is done decreasing the amount of solvent that would be present in a historic batch, which contributes plasticity to the batch. The batch is supplemented with a component in which at least the binder, the solvent, and the powder materials are essentially insoluble, which is termed the non-solvent. The non-solvent does not contribute plasticity to the batch. The non-solvent compensates for the lost solvent. The non-solvent provides the fluidity necessary for shaping, while maintaining stiff batches. This is unlike the solvent which provides both fluidity and acts as a medium for the binder to dissolve in, which results in a soft batch.

The increased stiffness is brought about by increasing the gel strength of the binder in the solvent and the batch. By gelling here is meant thickening that occurs when the binder and its solvent are combined. The gel strength of the binder is increased by increasing the weight ratio of the binder to the solvent by partial removal of the solvent from the batch that would historically be present.

If the solvent content of a like batch but without the non-solvent were to be reduced, the binder and the batch would be deprived of solvent necessary for complete plasticization of the binder, which is necessary to form a very stiff strong binder gel in the solvent and the batch. This increase in the effective concentration of the binder in the solvent would lead to a proportional increase in pressures, torques, and flow defects when these batches are shaped.

In the present invention, formability of the solvent-deprived stiff batches is enhanced by the use of the non-solvent. The non-solvent component of the batch provides the fluidity necessary for extrusion while maintaining the stiffness of the binder gel in the solvent. While not wishing to be bound by theory, it is believed that the formability is enhanced by the non-solvent being at two critical interfaces: (1) at the interface between the batch and the wall of the shaping apparatus, e.g. in extrusion this is the die/extruder wall, front end hardware (screen pack, homogenized flow control device), and (2) at the interfaces between the individual powder particles.

By highly filled mixtures is meant a high solid to liquid content in the mixture. For example, the powder material content in the mixture is typically at least about 45% by volume, and most typically at least about 55% by volume.

As mentioned previously, the components of the highly filled mixture or batch are (1) powders or mixtures of powders, (2) binder to bind the particles, (3) solvent for the binder which imparts plasticity (binder dissolves in the solvent to provide plasticity), (4) the non-solvent with respect to at least the binder, the solvent, and the powder materials, and (5) surfactant which functions as a lubricant/dispersant to disperse the powders in the plasticized mixture, and (6) the organosilicon compound which can make up at least part of the non-solvent or be a component separate from the non-solvent.

The Powder Material

Typical powders are inorganics such as ceramic, glass ceramic, glass, molecular sieve, metal, or combinations of these.

The invention is especially suitable for use with ceramic, particularly with cordierite and/or mullite-forming raw material powders.

By ceramic, glass ceramic and glass ceramic powders is meant those materials as well as their pre-fired precursors. By combinations is meant physical or chemical combinations, eg., mixtures or composites. Examples of these powder materials are cordierite, mullite, clay, talc, zircon, zirconia, spinel, aluminas and their precursors, silicas and their precursors, silicates, aluminates, lithium aluminosilicates, feldspar, titania, fused silica, nitrides, carbides, borides, eg., silicon carbide, silicon nitride, soda lime, aluminosilicate, borosilicate, soda barium borosilicate or mixtures of these, as well as others.

Especially suited are ceramic materials, such as those that yield cordierite, mullite, or mixtures of these on firing, some examples of such mixtures being about 2% to about 60% mullite, and about 30% to about 97% cordierite, with allowance for other phases, typically up to about 10% by weight. Some ceramic batch material compositions for forming cordierite that are especially suited to the practice of the present invention are those disclosed in U.S. Pat. No. 3,885,977 which is herein incorporated by reference as filed.

In accordance with a preferred embodiment, one composition which ultimately forms cordierite upon firing is as follows in percent by weight, although it is to be understood that the invention is not limited to such: about 33 to about 41, and most preferably about 34–40 of aluminum oxide, about 46–53 and most preferably about 48–52 of silica, and about 11–17 and most preferably about 12–16 magnesium oxide.

The powders can be synthetically produced materials such as oxides, hydroxides, etc., or they can be naturally occurring minerals such as clays, talcs, or any combination of these. The invention is not limited to the types of powders or raw materials. These can be chosen depending on the properties desired in the body.

Some typical kinds of powder materials are given below. The particle size is given as median particle diameter by Sedigraph analysis, and the surface area is given as $N_2$ BET surface area.

Some types of clay are non-delaminated kaolinite raw clay, such as Hydrite MP# clay, or Hydrite PX# clay, delaminated kaolinite, such as KAOPAQUE-10™ (K10) clay, and calcined clay, such as Glomax LL. All of the above named materials are sold by Dry Branch Kaolin, Dry Branch, Georgia. Some typical kinds of talc are those having a surface area of about 5–8 $m^2/g$, such as supplied by Barretts Minerals, under the designation MB 96–67.

Some typical aluminas are coarse aluminas, for example, Alcan C-700 series, such as C-170™, or fine aluminas such as A-16SG from Alcoa.

The silica from the organosilicon compound replaces some of the silica that would be provided by the powder material. The amount silica therefore provided by the powder material is adjusted to allow for the silica contributed by the organosilicon compound that would be expected to remain with the fired product. One typical kind of silica is that having a particle size of about 9–11 micrometers, and a surface area of about 4–6 $m^2/g$, such as IMSIL™ sold by Unimin Corporation.

In filter applications, such as in diesel particulate filters, it is customary to include a burnout agent in the mixture in an amount effective to subsequently obtain the porosity required for efficient filtering. A burnout agent is any particulate substance (not a binder) that burns out of the green body in the firing step. Some types of burnout agents that can be used, although it is to be understood that the invention is not limited to these, are non-waxy organics that are solid at room temperature, elemental carbon, and combinations of these. Some examples are graphite, cellulose, flour, etc. Elemental particulate carbon is preferred. Graphite is especially preferred because it has the least adverse effect on the processing. In an extrusion process, for example, the rheology of the mixture is good when graphite is used. Typically, the amount of graphite is about 10% to about 30%, and more typically about 15% to about 30% by weight based on the powder material.

Molecular sieves can also be shaped into bodies in accordance with this invention. Molecular sieves are crystalline substances having pores of size suitable for adsorbing molecules. The molecular sieve can be in the crystallized form or in the ammonium form or hydrogen form, or ion-exchanged with or impregnated with a cation. The molecular sieves can be provided in ion exchanged form or impregnated with cations either before forming into a body or after the product body has formed. The ion-exchange and impregnation methods are well known processes. Such treatments are within the scope of this invention.

Some types of molecular sieves which are preferred for the practice of the present invention are carbon molecular sieves, zeolites, metallophosphates, silicoaluminophosphates, and combinations of these. Carbon molecular sieves have well defined micropores made out of carbon material.

The molecular sieves that are especially suited to the invention are the zeolites. Some suitable zeolites are pentasil, such as ZSM-5, Y, such as ultrastable Y, beta, mordenite, X, such as 13X, or mixtures thereof.

Any sinterable metal or metal composition can be used in the practice of the present invention. Especially suited are iron group metal, chromium, and aluminum compositions, with the preferred iron group metal being iron. Especially preferred is Fe, Al, and Cr. For example, Fe5–20Al5–40Cr, and Fe7–10Al10–20Cr powders with other possible additions are especially suited. Some typical compositions of metal powders are disclosed in U.S. Pat. Nos. 4,992,233, 4,758,272, and 5,427,601 which are herein incorporated by reference as filed. U.S. Pat. No. 4,992,233 relates to methods of producing porous sintered bodies made from metal powder compositions of Fe and Al with optional additions of Sn, Cu, and Cr. U.S. Pat. No. 5,427,601 relates to porous sintered bodies having a composition consisting essentially of in percent by weight about 5–40 chromium, about 2–30 aluminum, 0-about 5 of special metal, 0-about 4 of rare earth oxide additive and the balance being iron group metal, and unavoidable impurities such as eg., Mn or Mo, with the preferred iron group metal being iron. When rare earth oxide is present, the special metal is at least one of Y, lanthanides, Zr, Hf, Ti, Si, alkaline earth metal, B, Cu, and Sn. When no rare earth oxide is present, the special metal is at least one of Y, lanthanides, Zr, Hf, Ti, Si, and B, with optional additions of alkaline earths, Cu, and Sn.

In general, the powder material is fine powder (in contrast to coarse grained materials) some components of which can either impart plasticity, such as clays, when mixed with water for example, or which when combined with the organic binder can contribute to plasticity.

The weight percents of the binder, solvent, and non-solvent are calculated as superadditions with respect to the non-organic solids by the following formula:

$$\frac{\text{weight of binder, solvent, non-solvent, or other additives}}{\text{weight units of powder materials}} \times 100.$$

The Binder

The function of the binder is to bind the inorganic powders and impart plasticity to the batch when mixed with a solvent. The preferred binders used in this invention are aqueous based, that is, capable of hydrogen bonding with polar solvents. Examples of binders are cellulosics, starches, poly(vinyl alcohol), poly(vinyl pyrrolidone), gums such as guar gum, xanthan gum, carageenan, etc, alginates, polyethylene oxides, polyamides, and/or polyacrylates. A combination of binder and cross-linking agent can also be used as a binder component (e.g. Polyvinyl alcohol with borax, polyacrylates with poly(vinyl alcohol). Hydrophobically modified aqueous binders can also be used.

Especially useful in the practice of this invention are cellulose ether binders for aqueous systems.

Some typical cellulose ether binders according to the present invention are methylcellulose, ethylhydroxy ethylcellulose, hydroxybutyl methylcellulose, hydroxymethylcellulose, hydroxypropyl methylcellulose, hydroxyethyl methylcellulose, hydroxybutylcellulose, hydroxyethylcellulose, hydroxypropylcellulose, sodium carboxy methylcellulose, and mixtures thereof. Methylcellulose and/or methylcellulose derivatives are especially suited as organic binders in the practice of the present invention with methylcellulose, hydroxypropyl methylcellulose, or combinations of these being preferred. Preferred sources of cellulose ethers are Methocel A4M, F4M, F240, and K75M celloluse products from Dow Chemical Co. Methocel A4M cellulose is a methylcellulose. Methocel F4M, F240, and K75M cellulose products are hydroxypropyl methylcellulose.

The properties of preferred cellulose ether binders such as methylcellulose are water retention, water solubility, surface activity or wetting ability, thickening of the mixture, providing wet and dry green strength to the green bodies, thermal gelation and hydrophobic association in an aqueous environment. Cellulose ether binders that promote hydrophobic association with the non-solvent and hydrogen bonding interaction with the solvent are desirable. Examples of substituent groups that provide hydrophobic association with the non-solvent are methoxy, propoxy, and butoxy groups. These substituents which provide the hydrophobic association also contribute to the gel strength of the binder. The substituent groups that maximize the hydrogen bonding interaction with polar solvents e.g. water, are hydroxypropyl and hydroxyethyl groups, and to a smaller extent hydroxybutyl groups. This combination of properties enables binders to be at the interface between the solvent and non-solvent.

Cellulose ethers that provide especially good hydrophobic-hydrophilic balance are hydroxypropyl methylcellulose, hydroxyethylcellulose, hydroxyethyl methylcellulose, a combination of hydroxyethyl or hydroxypropyl with methyl, ethyl, propyl, and butyl cellulose.

The distribution (random vs. blocking) of the substituent groups along the polymer chain also plays a critical role in determining the gel strength of the binder. Blocky substitution contributes to higher gel strength relative to random substitution.

Gel strength increases also with an increase in concentration of the binder in the solvent. The increase in concentration of the binder in the solvent lowers the thermal gelation temperature.

The organic binder makes up typically about 2–12% by weight, and more typically about 2–4% by weight of the powder materials.

The Solvent

The solvent provides a medium for the binder to dissolve in thus providing plasticity to the batch and wetting of the powders. The solvent can be aqueous based, which are normally water or water-miscible solvents; or organically based. Most useful are aqueous based solvents which provide hydration of the binder and powder particles.

The Non-Solvent

The non-solvent is not a solvent for at least the binder, the solvent, and the powder materials. The non-solvent is lower in viscosity than the binder-solvent combination. Partial solubility of cellulose ether binders in the non-solvent would result in increase of viscosity of the non-solvent, and loss of lubricating properties needed to shape a stiff batch. This would result in an increase in shaping pressures and torques. The function of the non-solvent is to provide the fluidity necessary for shaping, while maintaining the strength of the binder in the solvent. The non-solvent can have dissolved surfactants, secondary binders, lubricants, and additives that enhance the rheological performance. The amount of dissolved substances should be so as to not adversely impact the rheology of the mixture.

In case of an aqueous binder system, the non-solvent is hydrophobic relative to binder in the solvent e.g. water. One preferred binder-solvent combination is cellulose ether in water. In this combination, the non-solvent hydrophobically associates through the methoxy substituent of the binder. This combination is especially advantageous for cordierite and/or mullite-forming raw material powders.

With aqueous-based binder solvents, such as water, non solvents can be chosen from both synthetic and natural substances.

U.S. patent applications Ser. Nos. 09/115,929, 09/116,144, 09/320,938, and 09/321,013 disclose non-solvents, and are herein incorporated by reference as filed.

The Organosilicon Compound

The organosilicon compound converts to an inorganic binder, that contributes to the strength and durability of the fired product. The organosilicon compound is a material that yields silica on firing. It can be present either as at least part of the non-solvent, or as a component separate from, i.e., independent of the non-solvent composition. Various combinations of organosilicon compounds can be used as long as the entire non-solvent component results in stiff mixtures and green bodies.

The organosilicon compound is generally one or more of the group of compounds called siloxanes. Typically these siloxanes have alkyl, aryl, and/or hydroxyl functional groups. These compounds can be polysiloxanes preferably: (1) with a hydroxyl functional group, the compound being a silanol-terminated siloxane, such as e.g. silicone resin; or (2) with dimethyl, diphenyl, phenyl, methyl, and/or phenylmethyl as functional groups, such as e.g. polydimethylsiloxanes.

Polydimethylsiloxanes consist of a polymeric backbone of alternating silicon and oxygen atoms forming a siloxane chain network. Two methyl groups are found as attached side groups to each silicon atom. The number of repeating units can range from 1 to several thousand to give a wide range of molecular weights. The flexibility of the siloxane chain however, allows these polymers to exist as fluids over this wide range of molecular weights, with viscosity increasing with molecular weight. Microscopically the structure of such fluids offers low intermolecular forces between the pendent methyl groups, and unique flexibility of the siloxane backbone which offers the feature of lower surface energies.

Organosilicon compounds can be used in various forms. For example, a preferred method of using polydimethylsiloxane is the emulsion in which uniform distribution, and high strength are achieved without a solvent. Silicone resin, a solid, can be used as is, or dissolved in a solvent such as dibasic ester, or mixed as a solid with water and a surfactant to form a colloidal dispersion. Used as is, as a solid, it can be mixed into the composition. This form is advantageous because it is easily processed as there is no solvent that has to be subsequently removed; but some strength can be sacrificed. When dissolved in a solvent, the advantage is that there is more uniform mixing, and good green strength in the body.

Solid organosilicon materials whether as is or in the form of a colloidal dispersion, are suitable for use separate from the non-solvent. Solid materials dissolved in a solvent can be used as part of the non-solvent, but with other non-solvents present.

When used independently of the non-solvent composition, it is advantageous to use a silicone resin having a molecular weight of about 2,000 to 4,000.

When used as at least part of the non-solvent, the organosilicon compound, (in fluid form) typically has a viscosity at room temperature of about 40 to 350 cps. In this embodiment a preferred organosilicon compound is polydimethylsiloxane, having a relatively low molecular weight e.g. of about 3,000 to 14,000.

When used as at least part of the non-solvent, the organosilicon compound can also be in the form of an aqueous emulsion, with the hydrophobic portion being at least part of the actual non-solvent, and the aqueous portion being part of the solvent. Some examples of this latter embodiment are (1) an aqueous aqueous polydimethylsiloxane emulsion, where the polydimethylsiloxane has a molecular weight of about 14,000 to 120,000, and (2) an aqueous emulsion of silanol terminated polysiloxane, where the silanol terminated polysiloxane has a molecular weight of about 40,000 to 160,000.

With the organosilicon compound included as at least part of the non-solvent, it is advantageous to include hydrocarbons as the other constituent of the non-solvent. Examples of useful hydrocarbons are alkanes, alkenes, alkynes, cycloaliphatics, synthetic lubricant base stocks (industrial, automotive, agricultural), polyolefins, and aromatics. Examples of these types of materials are paraffinic oils, eg mineral oil, hydrogenated polybutenes, alpha olefins, internal olefins, polyphenyl ethers, polybutenes, and polyisobutylene.

In this embodiment, the non-solvent is composed preferably of polysiloxanes with alkyl, aryl, and/or hydroxy functional groups and hydrocarbons which can be straight chain and/or branched chain, saturated and/or unsaturated, and/or cyclic hydrocarbons including aromatic, and/or halogenated hydrocarbons exhibiting a carbon chain length having a distribution ranging from 8 to 40. Most advantageous is a non-solvent composed of polydimethylsiloxane and hydrocarbons, the hydrocarbons being light mineral oil ($C_{18}$–$C_{36}$), isoparaffins, (e.g. $C_9$–$C_{12}$ (odorless mineral spirits), $C_{12}$–$C_{15}$, or $C_{15}$–$C_{20}$), and/or polyalpha olefins, (e.g. $C_{15}$–$C_{20}$, or $C_{20}$–$C_{30}$).

Examples of other non-solvents that can be used in conjunction with the organosilicon compound are fluorine compounds, phosphate esters, esters, liquid $CO_2$, supercritical fluids e.g. supercritical $CO_2$, and hot water at a temperature above the thermal gelation temperature for a given cellulose ether, and combinations of these. When hot water is used as a non-solvent, it is in combination with at least one other non-solvent component.

Examples of esters are synthetic mono and diesters, and natural fatty acid esters (glycerides). Examples of mono and diesters are adipates, phthalates, polyol esters such as trimethylolpropane, and pentaerythritol. Examples of fatty acid esters are natural plant and animal glycerides such as soybean oil, sunflower, palm, corn, coconut, cottonseed, castor oil, peanut oil, essential oils (rose, jasmine, orange, lime, etc.) soya fatty acid, tallow, bacon grease, lard, and fish oil.

Non-solvents can also be solids as long as they are processed at or above the melt point of the solid. For example, fatty acids and fatty alcohols of carbon chain length greater than 22 can be used alone or in combination with other non-solvent components.

Some especially useful non-solvents are hydrocarbons, fatty acids having greater than 22 carbon atoms in their chains, fatty alcohols having greater than 22 carbon atoms in their chains, natural esters having 14 or more carbon atoms in their chains, synthetic esters, and combinations of these.

The solvent for the binder can also be made to function as a partial non-solvent and a partial solvent for the binder through use of additives in the batch. For example, in the case of aqueous based solvents such as water and a cellulose ether binder, additives that have greater affinity for water than for the cellulose ether binder, dehydrate the cellulose ether. The additives can be used to shift the solvent-non-solvent character of the water. The extent of dehydration is dependent on the additive concentration. The solvent/non-solvent balance of water can be adjusted with the type and concentration of additives such as glycerin, corn syrup, maple syrup, sucrose, sorbitol, and electrolytes such as the salts of alkali and alkaline earth metals.

Some especially suitable non-solvent combinations are silicone oil and low molecular weight hydrocarbons such as odorless mineral spirits.

The Surfactant

The surfactant plays an important role in determining the interfacial properties between the inorganic powders, between the inorganics and organics, and between the components of the organic system. The surfactant has the greatest influence in determining the gel strength of the binder, adhesion of the binder gel to the inorganics, and adhesion of the non-solvent to the binder. It promotes emulsification between the solvent and non-solvent. The preferred surfactants co-exist with the binder at the interface between the solvent and non-solvent. In the formed mixture, the surfactant is at least partially miscible in both the solvent and the non-solvent. It disperses/wets the inorganic powders.

Typically, the surfactant is suitable if, by itself without other substances, it is insoluble in the solvent at room temperature.

Some surfactants that can be used in the practice of the present invention are $C_8$ to $C_{22}$ fatty acids and/or their derivatives. Additional surfactant components that can be used with these fatty acids are $C_8$ to $C_{22}$ fatty esters, $C_8$ to $C_{22}$ fatty alcohols, and combinations of these. Preferred surfactants are stearic, lauric, oleic, linoleic, palmitoleic acids, and their derivatives, stearic acid in combination with ammonium lauryl sulfate, and combinations of all of these.

Most preferred surfactants are lauric acid, stearic acid, oleic acid, and combinations of these. An especially preferred non-solvent for use with this latter group of surfactants is light mineral oil. Also, the organosilicon compound can function as a surfactant due to its ability to reduce the surface tension between the materials in the mixture.

The main interactions contributing to stiffness are the interactions of the binder with the (1) solvent, (2) surfactant, (3) surfactant-solvent, (4) inorganics-solvent, and (5) inorganics-surfactant-solvent.

Batch-Forming Mechanics

For best results, the sequence of addition of the various batch components is important. It is preferred that batch formation take place in two stages prior to the shaping step.

In the first stage or wetting stage of batch formation, the powder particles, surfactant, and binder are dry mixed followed by addition of the solvent such as in a Littleford mixer. The solvent is added in an amount that is less than is needed to plasticize the batch. With water as the solvent, the water hydrates the binder and the powder particles. The non-solvent is then added to the mix to wet out the binder and powder particles. The non-solvent typically has lower surface tension than water. As a result, it wets out the particles much more readily than the solvent. At this stage, the powder particles are coated and dispersed by the surfactant, solvent, and non-solvent. Depending on its physical form, the organosilicon compound can be added with the solids, if it is a solid, or if an emulsion, fluid, solution, or colloidal dispersion, it can be added before or after the solvent.

It is preferred that plasticization take place in the second stage. In this stage the wet mix from the first stage is sheared in any suitable mixer in which the batch will be plasticized, such as for example in a twin-screw extruder/mixer, auger mixer, muller mixer, or double arm, etc. During plasticization, the binder dissolves in the solvent and a gel is formed. The gel that is formed is stiff because the system is very solvent-deficient. The surfactant enables the binder-gel to adhere to the powder particles. The non-solvent partially migrates to the exterior of the particle agglomerates (inter-particle region) and to the interface between the batch and the walls of the vessel containing it, e.g. mixer, or extruder, or die wall. This results in a batch that is stiff in its interior and lubricated on its exterior.

Thus the batch is a system of particles separated by the solvent/surfactant/non-solvent bound/glued with the binder gel which is further coated with a film of the non-solvent and surfactant. Without wishing to be bound by theory, it is thought that the most important part of the system is for the binder/surfactant to co-exist at the interface between the solvent and the non-solvent lubricating fluid. The binder and the surfactant at the interface hydrogen-bond with the solvent and hydrophobically associate with the non-solvent. If the surfactant displaces the binder from the interface, it results in a soft batch or an unplasticized batch.

The resulting stiff batch is then shaped into a green body by any known method for shaping plasticized mixtures, such as e.g. extrusion, injection molding, slip casting, centrifugal casting, pressure casting, dry pressing, etc. The invention is best suited for extrusion through a die.

The extrusion operation can be done using a hydraulic ram extrusion press, or a two stage de-airing single auger extruder, or a twin screw mixer with a die assembly attached to the discharge end. In the latter, the proper screw elements are chosen according to material and other process conditions in order to build up sufficient pressure to force the batch material through the die. The extrusion can be vertical or horizontal.

As the stiff batch is passed through the extruder and the die, the film of lubricating fluid in the inter-particle region and at the interface between the batch and the extruder/die wall provides the lubrication necessary to maintain a lower total extrusion pressure for a stiff batch. If the mixing process is not high shear in the second or plasticization stage, the plasticization will occur during extrusion through the die because of high shear through the die, e.g. in forming a honeycomb, through the slots and holes.

The lubrication provided by the non-solvent enables the stiff batch to slip at the wall of the die/extruder. As the stiff batch is extruded, at points of high shear through the die, the non-solvent is partially squeezed out of the batch to the interface between the batch and the wall of the die/extruder. The driving force for the preferential migration of the non-solvent versus solvent to the interface is due to (1) the viscosity of the non-solvent being significantly lower than the viscosity of the binder-solvent gel or mixture, (2) the non-solvent being incompatible with the solvent, i.e. hydrophobic relative to it in the case of aqueous based solvents, and (3) the solvent being held by the binder and inorganics by hydration as opposed to the non-solvent which is free to migrate.

An unexpected benefit of this invention is that shaping e.g. extrusion can be done at significantly lower temperatures, i.e. at least about 25% lower, than was previously possible. Among other advantages of lower temperature processing, the lower temperatures in the case of the present invention enable extrusion at higher feed rates (at least 2 times, and generally about 2–2.5 times higher) than with historic batches. The temperature reduction observed is due to lower mixing torques. The lower mixing torques are due to lower inter-particle friction and lower friction of the batch with the extruder/die wall. Lower temperatures enable the cellulose ether binders to be processed well below thermal gelation temperature (at least 25% lower). An unexpected advantage of this invention is that it provides a method in which cellulose ether binders (in water as the solvent) can be processed with higher gel strength at higher throughputs. This is in direct contrast to the historical batches where the higher throughput capability was achieved through the use of cellulose ethers with low gel strength, which translates to drying blisters during dielectric drying. In addition, the heating rate of the batch, with an increase in throughput, is significantly lower than in historic batches.

The extrudability benefits of this invention are (1) cell orthogonality at the perimeter of the shaped body, and (2) smooth skin.

The stiff batches of this invention exhibit good shape retention at the die. In the case of multicellular structures, the cell orthogonality at the perimeter of the part closer to the skin is greatly improved.

The present invention is especially advantageous for RAM and twin screw extrusion of honeycombs at velocities of typically about 2.54–12.7 cm/sec (1–5"/sec).

The bodies of this invention can have any convenient size and shape and the invention is applicable to all processes in which plastic powder mixtures are shaped.

The process is especially suited to production of cellular monolith bodies such as honeycombs. Cellular bodies find use in a number of applications such as catalytic, adsorption, electrically heated catalysts, filters such as diesel particulate filters, molten metal filters, regenerator cores, etc.

Generally honeycomb densities range from about 235 cells/cm$^2$ (1500 cells/in$^2$) to about 15 cells/cm$^2$ (100 cells/in$^2$). Examples of honeycombs produced by the process of the present invention, although it is to be understood that the invention is not limited to such, are those having about 94 cells/cm (about 600 cells/in 2), or about 62 cells/cm2 (about 400 cells/in ) each having wall thicknesses of about 0.1 mm (4 mils). Typical wall thicknesses are from about 0.07 to about 0.6 mm (about 3 to about 25 mils), although thicknesses of about .02–0.048 mm (1–2 mils) are possible with better equipment. The method is especially suited for extruding thin wall/high cell density honeycombs.

The intrinsic material stiffness or wet green strength of this invention is typically about 2–2.5 times greater than with historic mixtures.

Stiffening is important for honeycombs having a large frontal area. For example, honeycombs of typically about 12.7–22.9 cm (5–9") diameter and lower cell density and very thin walls, e.g. 0.07–0.12 mm (3–5 mils) are more vulnerable to deformation as they leave the extrusion die. In accordance with this invention, there is no cell distortion at the perimeter, and there is significant improvement in shape. Therefore the rapid stiffening effects of the present invention are especially advantageous for those types of structures.

In addition to the stiffness of the batches, another important advantage of this invention is that there is improved shape retention of the green body. Shape retention is especially advantageous in forming complex structures. Shape of thin-wall cellular substrates e.g. 3–6 mil or less, is maintained typically at 2–2.5 times the feed rates for twin screw extrusion and higher extrusion velocities for ram extrusion.

Another advantage of the invention is that it decreases the wear on the extrusion die, and screw elements, thus extending their life.

The green body can then be dried and fired according to known techniques except that drying times will be shorter due to less water in the green body. Also, less drying energy is required than for historic batches. This is especially advantageous in dielectric drying operations.

The firing conditions of temperature and time depend on the composition and size and geometry of the body, and the invention is not limited to specific firing temperatures and times. For example, in compositions which are primarily for forming cordierite, the temperatures are typically from about 1300° C. to about 1450° C., and the holding times at these temperatures are from about 1 hour to about 6 hours. For mixtures that are primarily for forming mullite, the temperatures are from about 14000C to about 1600° C., and the holding times at these temperatures are from about 1 hour to about 6 hours. For cordierite-mullite forming mixtures which yield the previously described cordierite-mullite compositions, the temperatures are from about 1375° C. to about 1425° C. Firing times depend on factors such as kinds and amounts of materials and nature of equipment but typical total firing times are from about 20 hours to about 80 hours. For metal bodies, the temperatures are about 1000° C. to 1400° C. in a reducing atmosphere preferably hydrogen. Firing times depend on factors as discussed above but are typically at least 2 hours and typically about 4 hours. For zeolite bodies, the temperatures are about 400° C. to 1000° C. in air.

Firing times depend on factors as discussed above but are typically about 4 hours.

Without wishing to be bound by theory, it is believed that utilizing organosilicon compounds would have the following advantages: (1) reducing the possibility of cracking due to less weight loss and less structural reorganization that occurs in firing because of inorganic $SiO_2$ forming during firing; (2) organosilicon compounds act to decrease the intensity of the exotherm generated upon burnout of the organic components of the batch during firing. This may also reduce cracking levels by decreasing thermal gradients in the ware; (3) organosilicon compounds have been shown to improve the strength of the ware during the binder removal stage of the firing schedule, up to 600° C. and beyond, due to the formation of a silica network left by the conversion to silica, that can act as an inorganic binder system that forms strong bonds between particles. This is in contrast to non-silicone fluids that leave the part with less strength when they are removed.

To more fully illustrate the invention, the following non-limiting examples are presented. All parts, portions, and percentages are on a weight basis unless otherwise stated.

EXAMPLE 1

Silicone as Part of Non-Solvent

Various compositions are shown in Table 1. Some contain the a 100 centistoke silicone fluid as part or all of the non-solvent. Rods of 0.64 cm (1/4") diameter were extruded from the compositions, and fired to 400° C. for 8 hours. The strength at 400° C. is thought to be important to cracking of the ware. If the material can be strengthened during the low temperature portion of the firing schedule, particularly during and after burnout of the methylcellulose binder, it may be more resistant to cracking. Example 1—1 shows a composition containing no non-solvent. Example 2 shows a composition having 9% mineral oil as the non-solvent. It can be seen that the addition of the mineral oil results in a loss of strength in the rods of almost 50% (example 1—1 vs 1–2). The replacement or partial replacement of the mineral oil by silicone fluid as part of the non-solvent however, results in an increase in strength during this portion of the firing schedule. In fact, the strength is increased beyond that containing no non-solvent.

TABLE 1

|  | 1-1 C | 1-2 C | 1-3 I | 1-4 I | 1-5 I | 1-6 I | 1-7 I | 1-8 I |
|---|---|---|---|---|---|---|---|---|
| Talc (wt %) | 40.9 | 40.9 | 41.4 | 41.8 | 41.8 | 42.2 | 42.5 | 40.9 |
| Kaolin (wt %) | 12.8 | 12.8 | 13.0 | 13.1 | 13.1 | 13.2 | 13.3 | 13.5 |
| Calcined Kaolin (wt %) | 32.6 | 32.6 | 30.6 | 29.2 | 29.2 | 27.8 | 26.4 | 24.9 |
| Alumina (wt %) | 13.7 | 13.7 | 15.0 | 15.9 | 15.9 | 16.8 | 17.8 | 18.7 |
| Methocellulose (wt %) | 2.7 | 2.7 | 2.7 | 2.7 | 2.7 | 2.7 | 2.7 | 2.7 |
| Stearic Acid (wt %) | 0.6 | 0.6 | 0.6 | 0.6 | 0.6 | 0.6 | 0.6 | 0.6 |
| Silicone fluid (wt %) | 0 | 0 | 3.0 | 5.1 | 5.1 | 7.2 | 9.4 | 11.5 |
| Mineral oil (wt %) | 0 | 9 | 0 | 0 | 4 | 0 | 0 | 0 |
| MOR (psi) | 238 | 128 | 397 | 483 | 469 | 595 | 602 | 620 |

For all tables: C denotes comparative examples; I denotes inventive examples.

It was found that blends of mineral oil and silicone fluid give the best combination of low temperature strength and stiffness after extrusion. Table 2 gives Theological data on silicone fluid/mineral oil blends.

TABLE 2

Rheological Data for Silicone Fluid/Mineral Oil Blends

|  | 2-1 C | 2-2 I | 2-3 I | 2-4 I |
|---|---|---|---|---|
| Talc | 40.9 | 41.2 | 41.6 | 42.2 |
| Kaolin | 12.8 | 12.9 | 13.1 | 13.2 |
| Calcined Kaolin | 32.6 | 31.3 | 19.9 | 27.8 |
| Alumina | 13.7 | 14.6 | 15.5 | 16.8 |
| Methyl-cellulose | 2.7 | 2.7 | 2.7 | 2.7 |
| Stearic Acid | 0.4 | 0.4 | 0.25 | 0.4 |
| Mineral oil | 9.2 | 7 | 5 | 2 |
| Silicone fluid | 0 | 2.0 | 4.1 | 7.2 |
| % Water | 24.0 | 24.5 | 24.0 | 24.5 |
| TTP (Time to peak (min)) | 2:02 | 1:48 | 1:44 | 1:34 |
| Peak Torque m-9 | 2655 | 3335 | 4478 | 4594 |
| Peak + 4 min Torque m-9 | 1920 | 2122 | 3184 | 2891 |
| Ribbon Extrusion Pressure (Steady-state (kg)) | 174 | 140 | 136 | 126 |
| Deformation (mm) | 0.82 | 0.9 | 0.85 | 0.9 |
| Load (Kg) | 2.9 | 2.35 | 2.22 | 1.84 |
| L/D (Stiffness Kg/mm) | 3.52 | 2.61 | 2.61 | 2.04 |
| PLD Ratio (Stiffness) | 49.4 | 53.6 | 52.1 | 61.8 |

The L/D is a measure of the stiffness of the composition. The PLD ratio is given as the ratio of the final ribbon extrusion pressure to the Load/Deformation (L/D). The lower the PLD the higher the stiffness of the batch for a 5 given extrusion pressure. The ideal situation for extrusion of thin walled honeycomb structures is a low extrusion pressure coupled with high stiffness. Thus, a low PLD ratio is desired. It can be seen from Table 2 that the PLD ratio of the batches containing silicone fluid are 10 quite close to the value found for mineral oil alone. They decrease in stiffness only slightly at higher ratios of silicone fluid to mineral oil.

Differential thermal analysis data of green ware with and without silicone fluid is shown in Table 3. It can be seen that the addition of silicone fluid to the batch results in a decrease in exothermic activity as shown by the decrease in area under the exothermic peaks resulting from burnout of the organic constituents of the batch at about 150–500° C.

TABLE 3

Differential Thermal Analysis Data for Silicone-containing Compositions

|  | 3-1 C | 3-2 C | 3-3 I | 3-4 I | 3-5 I |
|---|---|---|---|---|---|
| Talc | 40.9 | 40.9 | 41.0 | 41.4 | 42.2 |
| Kaolin | 12.8 | 12.8 | 12.88 | 13.0 | 13.2 |
| Calcined Kaolin | 32.6 | 32.6 | 31.9 | 30.6 | 27.8 |
| Alumina | 13.7 | 13.7 | 14.2 | 15.0 | 16.8 |
| Mineral Oil | 0 | 9.2 | 8.0 | 8.0 | 6.0 |
| Silicone fluid | 0 | 0 | 1.0 | 3.0 | 7.2 |
| Area Under DTA Peak (Joules/gram) | 312 | 450 | 385 | 206 | 119 |

It can be seen that the addition of oil to the batch increases the exothermic intensity over the composition without oil. However, substitutions of even small amounts of silicone can decrease the intensity of the exotherm. The exotherm can create temperature differentials through the ware, which can result in internal stresses during shrinkage. These stresses can lead to cracking if they are severe enough. Therefore, the reduction in the exothermic intensity with the addition of silicone coupled with the increased strength during the low temperature portion of the firing schedule, is expected to decrease the propensity of cracking in this temperature range.

EXAMPLE 2

Silicone not Part of Non-Solvent

Several comparative and inventive compositions were made up and extruded and measured for strength and stiffness. The first three compositions are comparative and the last two show inventive. The first composition (4-1) shows a mixture of raw materials to form a honeycomb substrate. This composition contains no non-solvent or silicone. Torques are relatively high and stiffness is relatively poor. This composition would not be advantageous for applications such as extrusion of thin-walled honeycombs where a high degree of wet strength is important. The strength after burnout of the binder is thought to be important for crack resistance due to dimensional changes during firing.

Composition 4-2 is a comparative example showing a composition similar to composition 1 where some amount of silicone resin dissolved in dibasic ester in a 3:1 ratio has been added to the batch materials. This composition shows very high strength in the low temperature region of the firing schedule. However, the torques are high, and the stiffness (shown by the P/L/D) is poor, similar to the values found in composition 4-1. Therefore, this composition would also not be appropriate for extrusion of thin-walled honeycomb substrates.

Composition 4-3 shows a composition similar to that of example 4-1. The main difference is the presence of the non-solvent. The main differences can be seen in the low torque and high degree of stiffness found in this composition, which makes it advantageous for extrusion of thin-walled honeycomb substrates. However, the disadvantage is the much lower strength at 500° C. compared to the sample containing no non-solvent (4-1). The low strength makes this composition subject to higher levels of firing cracks than the other two comparative examples.

Compositions 4-4 and 4-5 show inventive compositions which have the benefits of the non-solvent for low torque and high stiffness, combined with a high degree of strength at 500° C., for a low level of firing cracks. This novel combination of properties was achieved by using the silicone resin either dissolved in the dibasic ester, or added as a dry material to the other dry ingredients, and mixing the raw materials together with the solvent and non-solvent and extruding the so-formed mixture.

TABLE 4

|  | 4-1 C | 4-2 C | 4-3 C | 4-4 I | 4-5 I |
|---|---|---|---|---|---|
| Inorganics |  |  |  |  |  |
| Talc | 40.38 | 40.38 | 40.38 | 40.38 | 40.38 |
| Calcined Kaolin | 27.09 | 19.69 | 27.09 | 19.69 | 19.69 |
| Raw Kaolin | 15.28 | 15.28 | 15.28 | 15.28 | 15.28 |
| Alpha alumina | 15.25 | 18.65 | 15.25 | 18.65 | 18.65 |
| Quartz | 2 | 2 | 2 | 2 | 2 |
| Organics |  |  |  |  |  |
| Hydroxypropyl Methyl Cellulose | 2.7 | 2.7 | 3 | 2.7 | 2.7 |
| Sodium Tallowate | 0.6 | 0.6 | — | — | — |
| Stearic acid | — | — | 0.5 | 0.4 | 0.4 |
| Silicone Resin (as a powder) | — | — | — | 7.27 | — |
| 3:1 Silicone Resin/ Dibasic ester (solvent) | — | 9.7 | — | — | 9.7 |
| Non-solvent linear alpha olefin $C_{12}$—$C_{15}$ | — | — | 6 | 6 | 6 |
| Water | 30.5 | 22 | 24.4 | 23.7 | 16 |
| Rheology Data |  |  |  |  |  |
| Brabender Torques (m-g) Peak-End | 3170-2270 | 3254-2269 | 2125-1280 | 1708-1244 | 2755-1848 |
| Ribbon Extrusion Pressure (Steady-state (kg)) | 148 | 152 | 171 | 171 | 152 |
| Stiffness (kg/mm) | 2.05 | 1.58 | 4.18 | 3.7 | 3.42 |
| Standard Deviation (n = 5) | 0.11 | 0.02 | 0.44 | 0.11 | 0.12 |
| Stiffness (PL/D (mm)) | 72.2 | 96.2 | 40.9 | 46.2 | 44.4 |
| Physical Properties Modulus of Rupture (psi) |  |  |  |  |  |
| @ 22 C. | 1217 | 2677 | 1559 | 1504 | 1658 |
| Standard Deviation (n = 10) | 231 | 301 | 86 | 197 | 81 |

TABLE 4-continued

|  | 4-1 C | 4-2 C | 4-3 C | 4-4 I | 4-5 I |
|---|---|---|---|---|---|
| @ 250 C. | 242 | 1012 | 223 | 314 | 574 |
| Standard Deviation (n = 10) | 33 | 116 | 36 | 35 | 62 |
| @ 500 C. | 251 | 2236 | 159 | 548 | 1570 |
| Standard Deviation (n = 10) | 31 | 436 | 21 | 134 | 194 |
| CTE 25–800° C. (x 10-7/° C.) {n = 1} | 6.8 | 4.9 | 6.4 | 5.2 | 6.1 |

It should be understood that while the present invention has been described in detail with respect to certain illustrative and specific embodiments thereof, it should not be considered limited to such but may be used in other ways without departing from the spirit of the invention and the scope of the appended claims.

What is claimed is:

1. A method for producing a fired body, the method comprising:
   a) compounding components comprising
      i) powder materials,
      ii) binder,
      iii) aqueous solvent for the binder,
      iv) surfactant,
      v) non-solvent with respect to at least the binder, the solvent, and the powder materials, wherein the non-solvent is selected from the group consisting of hydrocarbons, fluorine compounds, fatty acids having greater than 22 carbon atoms in their chains, fatty alcohols having greater than 22 carbon atoms in their chains, natural esters having 14 or more carbon atoms in their chains, synthetic esters, and combinations of these, and
      vi) an organosilicon compound, wherein the organosilicon compound comprises one or more siloxanes, wherein the organosilicon compound results in reduced cracking in the subsequently formed fired body,
      wherein the non-solvent is lower in viscosity than the binder combined with the solvent,
      and wherein the amount of solvent is less than the amount that would be used absent the non-solvent,
   b) mixing and plasticizing said components to form a plasticized mixture;
   c) shaping the plasticized mixture to form a green body; and
   d) firing the green body to produce a fired body.

2. A method of claim 1 wherein the solvent is water.

3. A method of claim 2 wherein the binder comprises a cellulose ether.

4. A method of claim 3 wherein the cellulose ether is selected from the group consisting of methyclellulose, methylcellulose derivatives, and combinations thereof.

5. A method of claim 1 wherein said organosilicon compound comprises polysiloxanes having functional groups selected from the group consisting of alkyl, aryl, hydroxy, and combinations thereof.

6. A method of claim 5 wherein said organosilicon compound comprises polysiloxanes having a hydroxy functional group, said organosilicon compound being a silanol terminated siloxane.

7. A method of claim 6 wherein said organosilicon compound is a silicone resin.

8. A method of claim 5 wherein said organosilicon compound comprises polysiloxanes having functional groups selected from the group consisting of dimethyl, diphenyl, phenyl, methyl, phenylmethyl, and combinations thereof.

9. A method of claim 8 wherein said organosilicon compound is polydimethylsiloxane.

10. A method of claim 1 wherein said organosilicon compound has a viscosity at room temperature of about 40 to 350 cps.

11. A method of claim 1 wherein said organosilicon compound is selected from the group consisting of polydimethylsiloxane fluid having a molecular weight of about 3,000 to 14,000.

12. A method of claim 1 wherein said organosilicon compound is selected from the group consisting of an aqueous polydimethylsiloxane emulsion, wherein said polydimethylsiloxane has a molecular weight of about 14,000 to 120,000, and an aqueous emulsion of silanol terminated polysiloxane, wherein said silanol terminated polysiloxane has a molecular weight of about 40,000 to 160,000.

13. A method of claim 1 wherein the powder materials are cordierite-forming raw materials.

14. A method of claim 1 wherein the shaping is done by passing the mixture through an extruder and then through a die to form a green extrudate.

15. A method of claim 14 wherein the mixture is plasticized within and extruded from a twin screw extruder.

16. A method of claim 14 wherein the mixture is extruded into a honeycomb structure.

17. A method of claim 1 wherein the non-solvent is hydrocarbon.

* * * * *